US012687187B2

(12) United States Patent
Singh

(10) Patent No.: US 12,687,187 B2
(45) Date of Patent: Jul. 21, 2026

(54) CORNER MEMBER FOR A REFORMER EXERCISE APPARATUS

(71) Applicant: Balanced Body, Inc., Sacramento, CA (US)

(72) Inventor: Harbir Singh, Roseville, CA (US)

(73) Assignee: Balanced Body, Inc., Sacramento, CA (US)

( * ) Notice: Subject to any disclaimer, the term of this patent is extended or adjusted under 35 U.S.C. 154(b) by 254 days.

(21) Appl. No.: 18/588,802

(22) Filed: Feb. 27, 2024

(65) Prior Publication Data

US 2024/0376920 A1    Nov. 14, 2024

Related U.S. Application Data

(60) Provisional application No. 63/465,397, filed on May 10, 2023.

(51) Int. Cl.
  *F16B 7/04*    (2006.01)
  *F16B 7/18*    (2006.01)

(52) U.S. Cl.
  CPC .............. *F16B 7/048* (2013.01); *F16B 7/187* (2013.01)

(58) Field of Classification Search
  CPC ........ F16B 12/30; F16B 12/40; F16B 12/446; F16B 37/045; F16B 7/187; F16B 12/44; F16B 12/50; F16B 7/04; A63B 21/00047; A63B 21/00058; A63B 21/00061; A63B 21/00065; A63B 21/4029; A63B 21/4031; A63B 22/0087; A63B 22/0089; A63B 22/0076; Y10T 403/551; Y10T 403/555; Y10T 403/42; Y10T 403/5733; Y10T 403/5793; Y10T 403/7096; Y10T 403/73; Y10S 403/12
  USPC ........ 403/293, 295, DIG. 12, 205, 305, 314, 403/382, 403
  See application file for complete search history.

(56) References Cited

U.S. PATENT DOCUMENTS

| | | | | |
|---|---|---|---|---|
| 4,859,008 | A * | 8/1989 | Eyre .................. | A47B 47/0008 312/107 |
| 6,647,590 | B2 * | 11/2003 | Haab ....................... | F16B 7/187 16/94 R |
| 7,802,408 | B2 * | 9/2010 | Asbury ................. | F16B 37/122 52/282.4 |
| 9,016,972 | B2 * | 4/2015 | Oetlinger .............. | E04B 1/5831 403/252 |

(Continued)

*Primary Examiner* — Amber R Anderson
*Assistant Examiner* — Zachary A Hall
(74) *Attorney, Agent, or Firm* — Greenberg Traurig, LLP

(57) ABSTRACT

A frame corner member includes an elongated hollow extrusion having a central corner portion and two leg portions extending from the central portion. Each leg portion includes an inner side wall spaced from and parallel to an outer side wall, and merging with the central portion. An outer end wall joins the inner and outer side walls, which each include an inner surface facing the inner surface of the other side wall. An opening through the outer end wall defines a space between the inner and outer side walls adjacent one end of the extrusion for receiving one end of one of frame side members and end members. At least one of the inner surfaces in the space has discrete surface features adapted to grip and retain the one end of one of the side members and end members in the space when received through the opening.

20 Claims, 3 Drawing Sheets

(56) References Cited

U.S. PATENT DOCUMENTS

| 10,820,698 B2 * | 11/2020 | Endelman | ............... | F16B 12/30 |
| 2024/0288025 A1 * | 8/2024 | An | ......................... | F16B 37/045 |

* cited by examiner

CORNER MEMBER FOR A REFORMER EXERCISE APPARATUS

CROSS REFERENCE TO RELATED APPLICATIONS

This application claims the benefit of priority of U.S. Provisional Patent Application Ser. No. 63/465,397, filed May 10, 2023, the content of which is incorporated herein in its entirety.

BACKGROUND OF THE DISCLOSURE

Field of the Disclosure

The present disclosure relates to structurally supportive frames. In particular, it relates to corner members for a physical exercise apparatus frame such as a reformer.

State of the Art

Exercise machines such as reformers utilized in the performance of physical exercises originated by Joseph Pilates include supportive frames. The frames typically include side members and end members coupled together to form a rectangular frame to support and elevate the remainder of the reformer above a surface such as a floor.

SUMMARY OF THE DISCLOSURE

A corner member for use in a reformer exercise apparatus in accordance with this disclosure preferably includes an elongated hollow metal extrusion having a longitudinal axis and, in transverse cross section, a central corner portion curving into two leg portions extending from the central corner portion at a right angle from the central portion. Each leg portion merges with the central corner portion. Each leg portion has an inner side wall spaced from an outer side wall parallel to the inner side wall and an outer end wall joining the inner and outer side walls.

The inner and outer side walls each having an inner surface facing an inner surface of the other of the inner or outer side wall. The outer end wall has an opening therethrough defining a space between the inner and outer side walls adjacent one end of the extrusion for receiving one end of one of the frame side members and end members. The central corner portion has a circular cross section portion tangent to each outer side wall and a straight inner connecting wall joining the inner side wall of each leg portion. At least one of the inner surfaces of the side walls in the space has discrete surface features adapted to grip and retain the one end of one of the side members and end members in the space when an end of one of the side members or end members is received through the opening.

The outer side walls of each leg portion each has a pair of inwardly projecting spaced axially extending ribs for receiving therebetween an elongated fastener nut member therein. These axial ribs each has a plurality of discrete surface features adapted to grip and retain the one end of one of the side members and end members when received through the opening in the outer end wall. The corner member is also configured with at least a pair of apertures or holes through each inner side wall adapted to receive a fastener therethrough. The fastener is configured to engage a threaded bore through an elongated fastener nut member captured between the axially extending ribs.

BRIEF DESCRIPTION OF THE DRAWINGS

The disclosure will be better understood and objects, other than those set forth above, will become apparent when consideration is given to the following detailed description. Such description makes reference to the accompanying drawings wherein.

DETAILED DESCRIPTION

Figure 1:
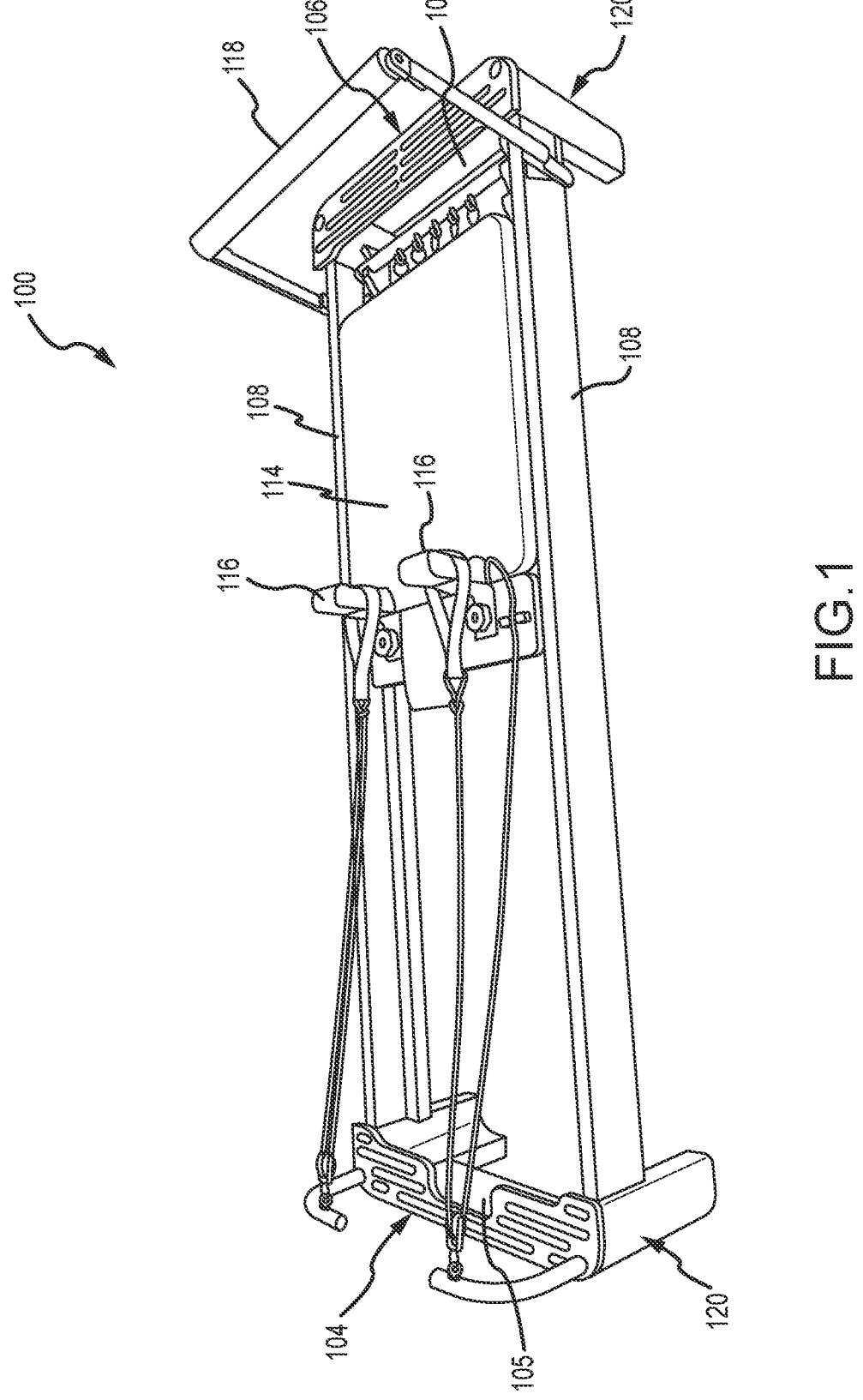
FIG. 1 is a perspective view of a reformer exercise apparatus incorporating a corner member in accordance with the present disclosure.

FIG. 1 is a perspective view of a reformer exercise apparatus 100. The reformer exercise apparatus 100 includes a rectangular frame 102 that provides structural support for various other constituent parts of the reformer exercise apparatus 100 (also referred to herein simply as a "reformer"). The frame 102 includes a head end 104 positioned at one end of the reformer 100. The frame 102 also includes a foot end 106 positioned at an end of the reformer 100 that is opposite the head end 104. The head end 104 and the foot end 106 each include an end frame member 105, 107 respectively. The head end member 105 and foot end member 107 of the frame 102 each join one of two parallel side members 108 via a corner member or leg 120. Thus the reformer frame 102 has four corner members 120.

The reformer 100 also includes a carriage 114. The carriage 114 is positioned between the side members 108 of the frame 102 for movement between the head 104 and foot 106 ends of the frame 102 on tracks carried by and between the side members 108. The carriage 114 includes shoulder stops 116 and the carriage 114 accommodates the weight of a user of the reformer 100. For example, the user of the reformer 100 may lie upon the carriage 114 with his or her feet positioned against a foot bar 118 near the foot end 106 and his or her head positioned between the shoulder stops 116 and oriented toward the head end 104. Through an alternating pushing force exerted upon the foot bar 118, the carriage 114 may be alternately moved toward and away from the foot end 106.

In the following description, numerous specific details are set forth in order to provide a more thorough disclosure. It will be apparent, however, to one skilled in the art that the art disclosed may be practiced without these specific details. In some instances, well-known features may have not been described in detail so as not to obscure the art disclosed.

The bottom ends of the corner members 120 each contact a typically flat surface, such as a floor 112, thereby providing structural support for and elevating the rectangular portion of the frame 102 above the floor 112. It is to be understood however, that should the floor 112 not be level, the length of each of the corner members 120 may be selected or an elevating cushion installed on the bottom of each corner member 120 so as to compensate, i.e., position the upper rectangular shape of the frame 102 either level or at an angle of inclination desired by a user. For purposes of this disclosure, the floor 112 is assumed to be appropriately level.

Figure 2:
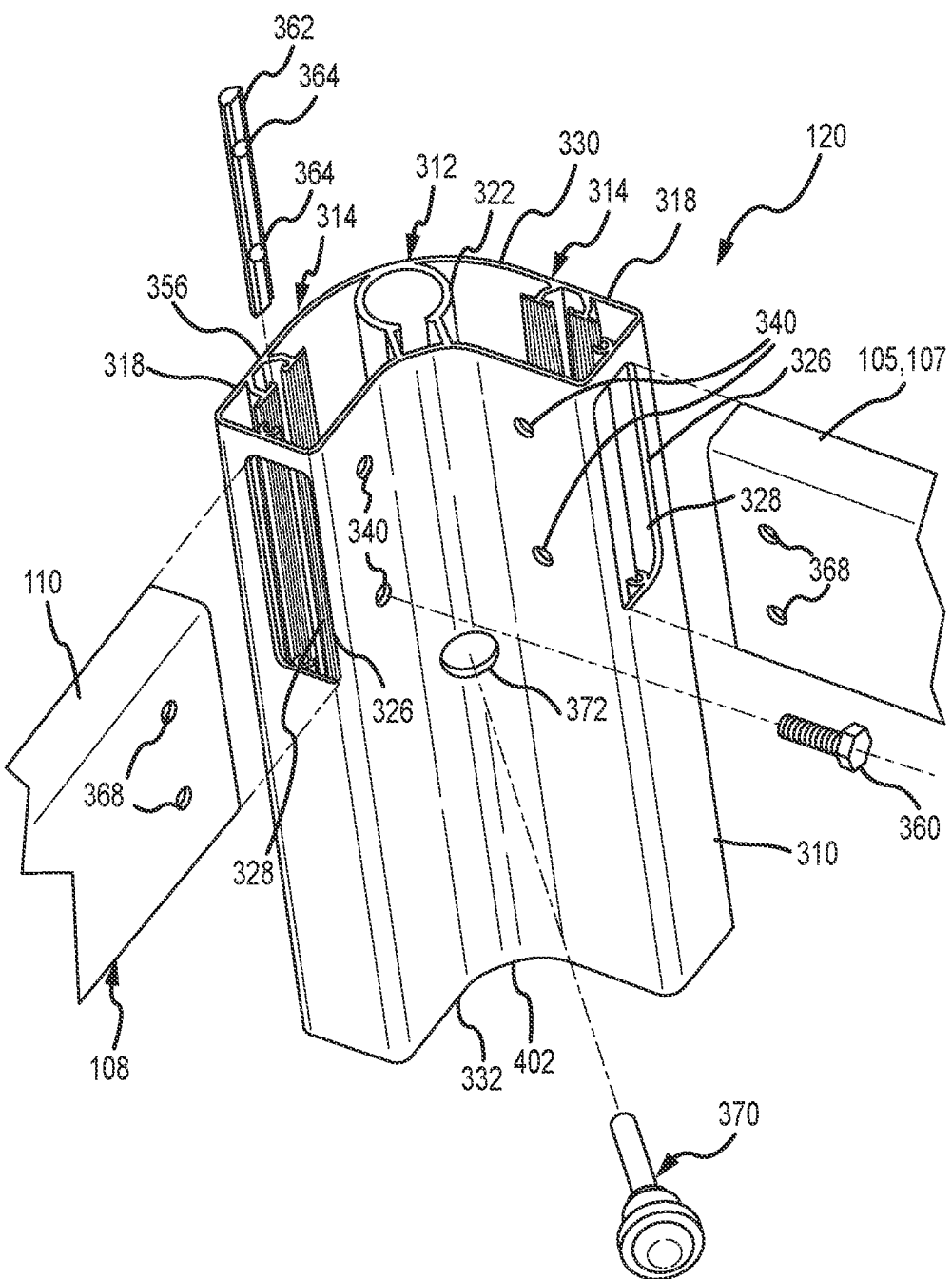
FIG. 2 is a perspective view of a reformer frame corner member in accordance with one embodiment of the present disclosure.
Figure 3:
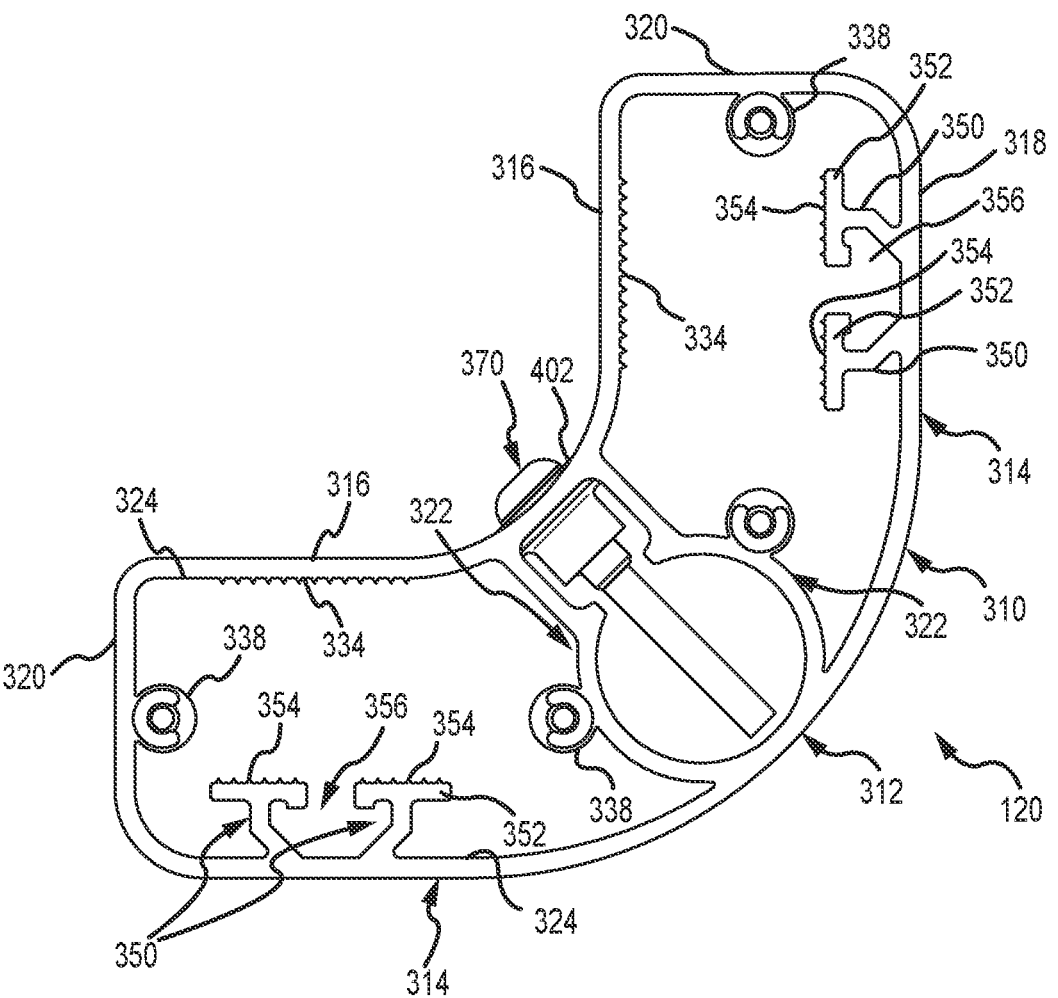
FIG. 3 is a top plan view of the corner member shown in FIG. 2.

FIG. 2 is a separate perspective view of a corner member 120 used in the frame 102. FIG. 3 is a plan view of the corner member 120 with a standing top plate removed. The corner member 120 is preferably an elongated, hollow metal extrusion 310, having a common longitudinal axis, preferably an extrusion made of aluminum or an aluminum alloy. The metal extrusion 310, in lateral or transverse cross section, or when viewed from one end, includes a central corner portion 312. The metal extrusion 310 also includes two leg portions 314 each extending from the central corner portion 312 at a right angle therebetween.

Each leg portion 314 of the metal extrusion 310 includes an inner side wall 316 and an outer side wall 318. In the embodiment shown, the inner side wall 316 is spaced from the outer side wall 318. The outer side wall 318 is parallel to the inner side wall 316. The inner side wall 316 and the outer side wall 318 merge with the corner portion 312.

An outer part of this corner portion 312 has a circular tubular cross section such that outer side wall 318 of each leg portion 314 curves and tangentially merges with the corner portion 312. Each leg portion 314 of the metal extrusion 310 also includes an outer end wall 320 joining the inner side wall 316 and the outer side wall 318. The outer end wall 320 of each leg portion 314 is positioned distal the corner portion 312. Each of the two leg portions 314 of the metal extrusion 310 includes a corner wall 322 joining the inner side wall 316 and the outer side wall 318. The corner wall 322 of each leg portion 314 forms an inner part of the central corner portion 312. The corner wall 322 has a straight portion and a curved portion forming a circular tubular cavity tangent to the outer side walls 318 within the corner portion 312 between the corner walls 322. These corner walls 322 together also provide additional structural support to the corner member 120 metal extrusion 310 during, for example, use and/or storage of the frame 102.

The inner side wall 316 and the outer side wall 318 of each leg portion 314 have inner surfaces 324 facing the other side wall (316, 318). The metal extrusion 310 also includes an opening 326 defined through the outer end wall 320 adjacent an upper end 330 of the extrusion 310. The opening 326 defines a space 328 between the inner side wall 316 and the outer side wall 318 near the upper end 330 of the extrusion 310.

As shown in FIG. 3, at least one of the inner surfaces 324 of at least one of the two leg portions 314 includes discrete surface features 334. The surface features 334 are preferably formed into the metal extrusion 310 integrally and contemporaneously with as part of the extrusion process used for manufacturing the corner member 120. As such, the surface features 334 extend along the entire length (e.g., between the upper extrusion end 330 and bottom lower extrusion end 332 preferably parallel to a longitudinal axis of the metal extrusion 310. In an alternative embodiment (not shown), the surface features 334 are not integrally formed during the extrusion process, but rather may be formed in and/or placed upon at least a portion of the inner surface(s) 324 after the metal extrusion 310 is manufactured. In such other embodiments, the surface features 334 either extend along the entire length of the metal extrusion 310 inner surface(s) 324 or they are present only along a portion or along portions of that length.

The metal extrusion 310 preferably includes at least one screw race 338 typically for engaging fasteners to attach a separate cap 214, 216 or other separate element. In the extrusion process for manufacturing the corner member 120 metal extrusion 310, at least one screw race 338 may be formed in at least one of the corner wall 322, the outer end wall 320, the inner side wall 316, the outer side wall 318, and the corner portion 312 of at least one of the two leg portions 314. The screw race(s) 338 may extend along the entire length of the metal extrusion 310. The screw race(s)

338 formed in the interior of the metal extrusion 310 of the corner member 120 and are thus not externally visible when the frame 102 is assembled and end caps are installed.

At least one of the two leg portions 314 of the metal extrusion 310 includes at least one pair of holes 340 defined through the inner side wall 316. Each of the two holes 340 is aligned cross-wise across the respective leg portion 314.

The opening 326 in the illustrated embodiment is sized and shaped for receiving one end 110 of one of the side members 108 and end members (105, 107) in the space 328 between the side walls 316 and 318 of the metal extrusion 310. Preferably, the opening 326 is sized to substantially match a cross-sectional area of the one end 110 of one of the side members 108 and end members (105 and/or 107). Dimensionally matching the one end 110 and the opening 326 in this manner facilitates a tight fit of the one end 110 into the metal extrusion 310 in preparation for further assembly steps of the frame 102.

During assembly of the frame 102, end member 105, 107 and/or side member ends 110 are inserted into the opening(s) 326 of the metal extrusion 310 and may be butted up against wall 322. The at least one pair of holes 340 are adapted to receive a fastener 360 therethrough to fasten the one end 110 of one of the side members 108 and end members (105, 107) in the spaces 328 as indicated by the broken lines in FIG. 2.

Referring now to the plan view of the extrusion 310 shown in FIG. 3, the outer side wall 318 includes a pair of spaced apart generally T shaped axial ribs 350 that protrude inward from the outer side wall 318 toward the opposing inner side wall 316. The flat end face 352 of each rib 350 has a plurality of surface features 354 that match and/or complement those on the inner surface of the inner side wall 316. These inner facing features 354 are oriented the same way as the surface features 334 on the inner wall 316 so that they interface with and grip the side surfaces of the end members 105, 107 or side member 108 ends 110 respectively when the end and side members are inserted through the openings 326 in the end walls 320 and a fastener 360 is installed through the holes 340 in the inner wall 316.

Each pair of ribs 350 forms a channel 356 therebetween configured to capture an elongated sliding nut member 362 therein. Each sliding nut member 362 has a pair of threaded bores 364, each for engaging a fastener 360 inserted through holes 340 and through a corresponding bore 368 through the side or end member 110, 105, 107. This fastener 360, which may be a simple bolt, is passed through one of the holes 340 and through a bore 368 and threaded into the threaded sliding nut member 362 and tightened to grip and hold the ends of the side or end member 110, 105, 107 securely to the corner member 120. In this manner each of the fasteners 360 is completely hidden from external view of the corner member 120 while still securely fastening the side rail 108 end 110 or the end member 105, 107 together with the corner member 120.

The side member 108 end(s) 110 are inserted into the space(s) 328 through the opening(s) 326. Next, fastener(s) 360 are inserted and received into and through the pair of holes 340. In the illustrated embodiment, a threaded end of the fastener 362 is first inserted into one of the holes 340 defined through the inner side wall 316, through one of the bores 368. The threaded end of the fastener 360 is then threaded into one of the threaded bores 364 through the sliding nut member 362 and tightened, thus fastening and securing the member end(s) 110, 105, or 107 inserted through the opening(s) 326 into the space(s) 328.

The surface features 334 of the metal extrusion 310 and the surface features 354 on the end faces 352 of the ribs 350 engage, grip and retain the end 110 inserted into the space(s) 328, when received through the opening(s) 326, as inner side wall 316 and the outer side wall 318 are squeezed together by tightening the fasteners 360. The resulting clamped contact between the end 110, or frame end members 105, 107 and the surface features 334 resists a tendency of the end(s) 110 to rotate under torque relative to the corner member(s) 120 in the assembled frame 102. This results in a simple very rigid structure.

Referring again to FIG. 3, the central corner portion 312 of the metal extrusion 310 also includes an inner connecting wall 402. This connecting wall 402 joins or merges the two inner side walls 316 of the metal extrusion 310 with the inner walls 322 of the central corner portion 312. The connecting wall 402 provides additional structural support to the corner member 120 metal extrusion 310. Also, as shown in FIG. 3, the connecting wall 402 is configured to receive a pin such as a spring loaded pin 370 that extends through an aperture 372 through this inner connecting wall 402. This pin 370 may be used to lock in place a foot board post, an arm cord riser tube, or other tubular or cylindrical member within the circular sleeve shaped cavity formed in the corner portion 312 by the curved portions of the corner walls 322 merging and joining the leg portions 314 forming the corner member 120.

Although it is described herein as including a "metal" extrusion 310, corner member 120 may be formed of a variety of materials besides, or in addition to, metals. For example, and without limitation, corner member 120 may be formed of materials of construction including plastic, wood, carbon-fiber, graphite, rock, stone, cement, and composite materials. Some of these other materials may not be amendable to extrusion-based processes and may instead require such manufacturing processes as cutting, molding, pressing, bending, and additive manufacturing, either instead of or in addition to extrusion methods. Such alternative processes for manufacturing of the corner member 204 will be appreciated by persons having skill in the art.

One of ordinary skill in the art will recognize and appreciate that the surface features 334 may be formed in a variety of ways and in a variety of shapes and sizes. For example, and without limitation, the surface features 334 may be formed as a plurality of raised bumps and/or ridges projecting away from the inner surfaces 324 into the space(s) 328. Also, for instance, the surface features 334 may include pyramidal, polygonal, conical, frusto-conical, cylindrical, rectangular, and/or other cubic projections extending away from the inner surfaces 324 into the space(s) 328. The corner member 120 metal extrusion 310 inner surface(s) 324 may therefore include surface features 334 including any combination of any number of one or a plurality of surface feature(s) 334 having shapes and sizes to facilitate accomplishing the several benefits as described herein, and still other benefits recognizable to one of skill in the art in a multitude of applications other than as related to particular embodiments discussed herein.

What is claimed is:

1. A corner member for use in a reformer exercise apparatus including a rectangular frame having a head end member, a foot end member and a pair of spaced parallel side members, the corner member comprising:

an elongated hollow metal extrusion having an axis and, in transverse cross section, a central corner portion and two leg portions extending from the central corner portion at a right angle from the central portion, each leg portion merging with the central corner portion, each leg portion having an inner side wall spaced from an outer side wall parallel to the inner side wall and an outer end wall joining the inner and outer side walls;

the inner and outer side walls each having an inner surface facing an inner surface of an other of the inner or outer side wall, and the outer end wall having an opening therethrough defining a space between the inner and outer side walls adjacent one end of the extrusion for receiving one end of one of the side members and end members;

wherein the central corner portion has a circular cross section portion tangent to each outer side wall and a straight inner connecting wall joining the inner side wall of each leg portion;

wherein at least one of the inner surfaces of the side walls in the space has discrete surface features adapted to grip and retain the one end of one of the side members and end members in the space when received through the opening; and wherein the outer side walls each has a pair of inwardly projecting spaced T shaped axial ribs for receiving therebetween an elongated fastener member therein, and wherein the axial T shaped ribs each has a plurality of discrete surface features adapted to grip and retain the one end of one of the side members and end members when received through the opening in the outer end wall.

2. The corner member of claim 1, wherein at least one of the two leg portions has at least one pair of holes defined through the inner side walls.

3. The corner member of claim 2, wherein the at least one pair of holes are adapted to receive a fastener therethrough extending into the elongated fastener member to fasten the one end of one of the side members or end members in the space between the inner and outer side walls.

4. The corner member of claim 1, wherein the surface features include a plurality of ribs extending parallel to an axis of the extrusion.

5. The corner member of claim 1, wherein each leg portion further includes a corner wall joining the inner and outer side walls.

6. The corner member of claim 5, wherein at least one of the corner wall, the outer end wall, the inner side wall, and the outer side wall includes a screw race.

7. A reformer exercise apparatus comprising:

a rectangular frame having a head end member, a foot end member and a pair of spaced parallel side members; and a corner member joining at least each side member to one of the head and foot end members, the corner member comprising:

an elongated hollow metal extrusion having an axis and, in cross section, a central corner portion and two leg portions each extending from the central portion at a right angle to an other of the two leg portions, each leg portion having an inner side wall spaced from an outer side wall parallel to the inner side wall and merging with the central portion, and an outer end wall joining the inner and outer side walls;

the inner and outer side walls each having an inner surface facing the inner surface of the other side wall, and an opening through the outer end wall defining a space between the inner and outer side walls adjacent one end of the extrusion for receiving one end of one of the frame side members and end members;

wherein the central corner portion has a circular cross section portion tangent to each outer side wall and a straight inner connecting wall joining the inner side wall of each leg portion;

wherein at least one of the inner surfaces of the side walls in the space has discrete surface features adapted to grip and retain the one end of one of the side members and end members in the space when received through the opening; and wherein the outer side walls each has a pair of inwardly projecting spaced T shaped ribs for receiving therebetween an elongated fastener nut member therein, and wherein the T shaped ribs each has an end face with a plurality of discrete surface features adapted to grip and retain the one end of one of the side members and end members when received through the opening in the outer end wall.

8. The reformer exercise apparatus of claim 7, wherein at least one of the two leg portions has at least one pair of holes defined through the inner side walls.

9. The reformer exercise apparatus of claim 8, wherein the at least one pair of holes are adapted to receive a fastener therethrough to fasten the one end of one of the side members and end members in the space.

10. The reformer exercise apparatus of claim 7, wherein the surface features include a plurality of ribs extending across the opening.

11. The reformer exercise apparatus of claim 7, wherein each leg portion further includes a corner wall joining the inner and outer side walls.

12. The reformer exercise apparatus of claim 11, wherein at least one of the corner wall, the outer end wall, the inner side wall, and the outer side wall includes a screw race.

13. A reformer frame having four corner members each joining a side member to one of a head end member and a foot end member, each corner member comprising:

an elongated hollow metal extrusion having an axis and, in cross section, a central corner portion and two leg portions each extending from the central portion at a right angle to each other, each leg portion having an inner side wall spaced from an outer side wall parallel to the inner side wall and merging with the central portion, and an outer end wall joining the inner and outer side walls;

the inner and outer side walls each having an inner surface facing the inner surface of the other side wall, and an opening through the outer end wall defining a space between the inner and outer side walls adjacent one end of the extrusion for receiving one end of one of the side members and end members;

wherein the central corner portion has a circular cross section portion tangent to each outer side wall and a straight inner connecting wall joining the inner side wall of each leg portion; and wherein the outer side walls each has a pair of inwardly projecting spaced T shaped axial ribs for receiving therebetween an elongated fastener nut member therein, and wherein the T shaped axial ribs each has an end face having a plurality of discrete surface features adapted to grip and retain the one end of one of the side members and end members when received through the opening in the outer end wall.

14. The reformer frame of claim 13, wherein at least one of the two leg portions has at least one pair of holes defined through the inner side wall.

15. The reformer frame of claim 14, wherein the at least one pair of holes are each adapted to receive a fastener therethrough to fasten the one end of one of the side members and end members in the space.

16. The reformer frame of claim 13, wherein the surface features include a plurality of ribs extending along the inner surface of at least one of the inner wall or the outer wall.

17. The reformer frame of claim 16 wherein the pair of T shaped axial ribs extend along the inner surface of the outer side wall parallel to the extrusion axis.

18. The reformer frame of claim 13, wherein each leg portion further includes a corner wall joining the inner and outer side walls.

19. The reformer frame of claim 18, wherein at least one of the corner wall, the outer end wall, the inner side wall, and the outer side wall includes a screw race.

20. The reformer frame of claim 13 wherein the surface features are on each of the inner surfaces of the inner wall and the outer wall.

* * * * *